United States Patent [19]
Marjoram

[11] Patent Number: 5,388,811
[45] Date of Patent: Feb. 14, 1995

[54] TORQUE-CONTROL SYSTEM FOR VEHICLES CABS AND THE LIKE

[75] Inventor: Robert H. Marjoram, Erie, Pa.

[73] Assignee: Lord Corporation, Erie, Pa.

[21] Appl. No.: 727,177

[22] Filed: Jul. 9, 1991

[51] Int. Cl.$^6$ .............................................. F16M 5/00
[52] U.S. Cl. ................... 267/140.13; 267/218
[58] Field of Search ......... 267/218, 140.1 R, 140.1 A, 267/64.28, 35, 140.11, 140.13; 248/562, 631, 636, 638; 138/30

[56] References Cited

U.S. PATENT DOCUMENTS

| | | | |
|---|---|---|---|
| 2,705,118 | 3/1955 | Beck | 248/10 |
| 3,399,905 | 9/1968 | Vogel | 267/218 X |
| 3,574,352 | 4/1971 | Elliott | 280/124 |
| 3,603,611 | 9/1971 | Wenham | 280/124 |
| 3,690,688 | 9/1972 | Fleury | 280/6 H |
| 3,703,999 | 11/1972 | Forys et al. | 248/638 X |
| 3,857,580 | 12/1974 | Keijzer et al. | 280/124 F |
| 3,871,635 | 3/1975 | Unruh et al. | 267/11 |
| 4,408,635 | 10/1983 | Packer | 138/30 |
| 4,506,751 | 3/1985 | Stephens | 180/89.15 |
| 4,581,892 | 4/1986 | Ahrens et al. | 60/330 |
| 4,700,971 | 10/1987 | Doi et al. | 280/708 X |
| 4,738,434 | 4/1988 | Marjoram et al. | 267/140.1 |
| 4,762,306 | 8/1988 | Watanabe et al. | 248/562 X |
| 4,784,378 | 11/1988 | Ford | 267/140.1 R X |
| 4,826,205 | 5/1989 | Kouda et al. | 280/703 |
| 4,858,900 | 8/1989 | von Broock | 248/562 X |
| 4,869,474 | 9/1989 | Best et al. | 248/562 X |
| 4,872,702 | 10/1989 | Medley | 280/708 |
| 4,881,712 | 11/1989 | Lun | 248/562 |
| 4,909,536 | 3/1990 | Hale | 280/707 |
| 4,966,390 | 10/1990 | Lund et al. | 280/772 |
| 5,016,910 | 5/1991 | Nagai | 280/707 |
| 5,101,929 | 4/1992 | Tobias | 248/562 X |

FOREIGN PATENT DOCUMENTS 1191651 11/1985 U.S.S.R. .................. 248/562

OTHER PUBLICATIONS

Fluid Air TM Cab Suspension Systems, Brochure, Nov. 1991.
Fluidlastic ® Technology, Brochure, Apr. 1991, p. 4.
Fluidlastic ® Mounts, PB-7417C, Feb. 1989.
R. H. Marjoram, "Pressurized Hydraulic Mounts for Improved Isolation of Vehicle Cabs", LL-2167, Dec. 1985.
H. J. Taylor, "The New Generation of Engine Mounts" SAE 862052, Apr. 1986.

Primary Examiner—Robert J. Oberleitner
Assistant Examiner—Peter M. Poon
Attorney, Agent, or Firm—Randall S. Wayland; Richard K. Thomson; James W. Wright

[57] ABSTRACT

A hydraulic mounting system for mounting a first body relative to a second body, such as a vehicle cab to a chassis, including at least two hydraulic mounts, which are useful for controlling torque between the two bodies. The relative torque-induced displacements of the two bodies are controlled within specific limits in reaction to a pressure applied by a pressure source in response to the actuation of a valve. The valve acts in response to a sensor and the system can include a leveling valve arrangement, or a more sophisticated external electronic control, or respond to a programmed routine. The improved torque-control system behaves as though it is statically stiff for restraining torque and dynamically soft for both translational and rotational isolation purposes. In addition, the system can control torque and damping independent of the direction of application of the torque.

8 Claims, 5 Drawing Sheets

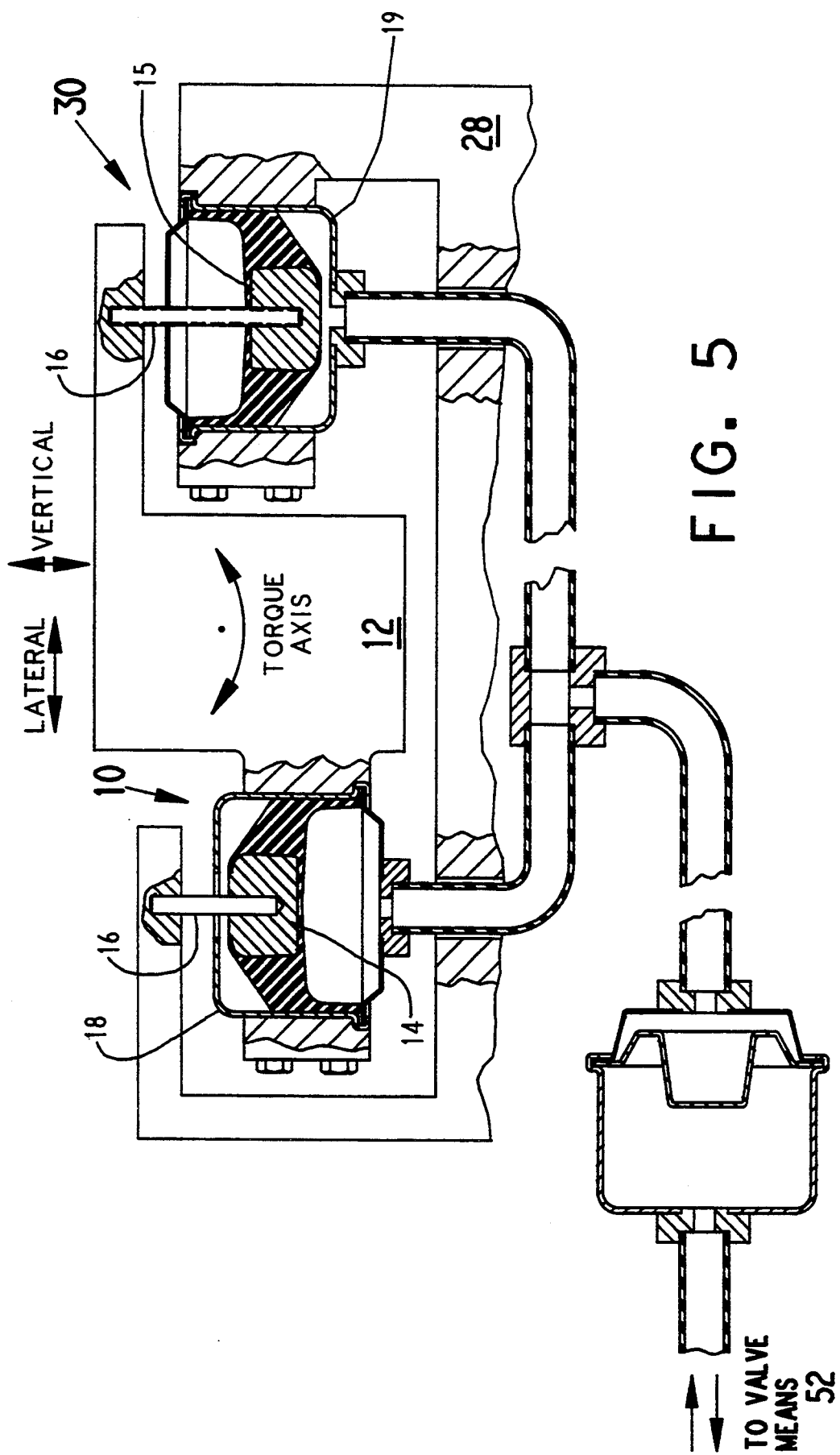

TORQUE-CONTROL SYSTEM FOR VEHICLES CABS AND THE LIKE

FIELD OF THE INVENTION

The present invention relates to a system for controlling torque and torque-induced deflections between two bodies, and more specifically, the present invention relates to a torque-control system of the type which utilizes two hydraulic mounts, wherein torque and resulting deflection between the bodies can be controlled.

BACKGROUND OF THE INVENTION

One type of torque-control mounting system is described in U.S. Pat. No. 2,705,118 issued to M. G. Beck on Mar. 29, 1955. This configuration can be found in FIG. 4 of the '118 patent and is shown in this application as the "prior art" in FIG. 1. In the '118 Beck patent, a pair of resilient hydraulic mountings are located at opposing sides of the torque axis of a first body. The hydraulic mountings include an outer housing, an inner member and an elastomeric wall portion which is moveable in response to vibrations thereof, and a chamber within each hydraulic mounting. The working fluid is contained within the chambers of the hydraulic mountings and within a conduit for interconnecting the two hydraulic mountings. This system creates a resilient connection between a first body and a second body for restraining relative movement therebetween. This invention is particularly useful as a torque restraint between the two bodies. Depending on the orientation of the hydraulic mountings, the torque restraint can provide a system which has both a relatively low degree of freedom, i.e., relatively high stiffness, about the torque axis and a relatively high degree of freedom, i.e., relatively low stiffness, along the relative translational axis.

The teachings of U.S. Pat. No. 4,236,607 and the commonly assigned U.S. Pat. No. 4,811,919, further provide the opportunity to tune the fluid mass contained in the conduit for tuning the dynamic characteristics of the mounting system. This is accomplished by either changing the length, and/or cross sectional area of the conduit or the fluid density, in an effort to change the fluid mass value. Thus, the system can be tuned to provide improved isolation for a specified operating condition, as is well known to those skilled in the art. In addition, a restriction can be added in the conduit, as taught in the '118 Beck patent. This will allow an increase in the damping level for amplitude control along the translational axis. This restriction increases the damping by throttling the fluid through this restriction. Again, the addition of restrictions is well known to those skilled in the art.

When torque is applied to the "prior art" torque restraint system about the torque axis in the positive torque direction, the relatively incompressible fluid in the mounting chambers and conduit is placed in compression, and thus provides a relatively high restraint to rotation. For movements of the one body relative to the second along either the vertical or lateral translational axis, fluid moves from the first mounting fluid chamber through the conduit to the second mounting fluid chamber. However, it should be understood that the desirability of providing high static rotational or roll stiffness and also low translational stiffnesses in the "prior art" systems are generally competing criteria. In other words, it is difficult to obtain a system which is both statically stiff in roll and soft in translation with the system taught in the '118 Beck patent. The reason for this is clear: the need for a high static roll stiffness for restraint of roll motions necessitates a very stiff elastomeric member. The stiff elastomeric member is needed to restrict the bulge of the elastomer, i.e., a high bulge stiffness is needed. However, because of the interrelationship of the bulge stiffness and translational stiffness, this results in a higher translational stiffness than is desired. For example, in order to obtain a high bulge stiffness, stiff elastomers, thin elastomer sections, and/or a shim must be used. As a result, the lateral and vertical translational stiffnesses are higher than they would be if thick sections, soft elastomers and no shim could be used. The end result is such that if one desires to limit roll motions with the "prior art" system, then the sacrifice is in limited isolation of vibrations in the translational directions. In other words, a statically stiff roll requirement results in a higher dynamic translational stiffness than an ideal system might have.

In addition, a system which is stiff in roll, both statically and dynamically, as is the "prior art" torque restraint, will result in a body or cab reaction to every minor roll load. For example, consider a dynamically stiff torque restraint connected between a chassis and a body or cab. If the chassis receives a sudden wheel impact or impulse, such as from hitting a large bump on only one wheel, the body or cab will react with a violent roll response, because a dynamically stiff roll restraint is attached. In other words, the rotational acceleration of the body or cab will be immediately felt by the driver. In essence, the dynamically stiff roll restraint provides such a high rotational natural frequency, that it does not isolate the body or cab from low frequency roll impact forces. Therefore, it would be desirable to have a system that is statically stiff and dynamically soft rotationally, such that torque restraint can be accomplished without sacrificing torsional or roll isolation.

Torsional motions resulting from large transient applied torques can be expected to occur in both the positive and negative torque directions in real systems. For example, the roll exerted on a truck cab or railway car when cornering is assumed to be an equally clockwise and counterclockwise occurrence. For the well known "prior art" torque restraint systems, torsional deflections in one direction will act to compress the column of fluid, while in the other, they will tend to pull the fluid apart. In the latter case, when the torque is sufficiently high, and rotations about the torque axis occur, the fluid, which has a finite vapor pressure, may pull apart or "cavitate". In other words, the negative torque-carrying capability is limited in the "prior art" torque restraint. Under this condition of cavitation, the fluid torque restraint system loses stiffness, and can not support additional torques about the torque axis in the negative torque direction. This is an undesired condition because large rotational deflections will occur after the cavitation torque limit is reached. In summary, "prior art" torque restraint systems were designed to accommodate uni-directional torque. When torques are applied in the negative torque direction, only limited torque can be reacted. In addition, the "prior art" systems are deficient in terms of damping motions in the negative torque direction, once cavitation occurs.

SUMMARY OF THE INVENTION

Therefore, in accordance with one aspect of the invention, control of a first body relative to a second body is provided such that the relative rotational displacements between the bodies are kept within certain limits. In accordance with another aspect, a system is provided which is extremely stiff in roll, yet very soft in translation. In accordance with yet another aspect of the present invention, a system is provided which is both dynamically soft rotationally and statically stiff rotationally. In accordance with still another aspect of the present invention, a system is provided for controlling the motions resulting from application of torque about the torque axis in both the positive and negative torque directions, i.e., bidirectional torque-control through damping. In a final aspect of the present invention, the system can accommodate for the change in temperature of the fluid in the mountings and allow for this by maintaining a predetermined relative rotational displacement between the two bodies.

In the preferred embodiments of the invention, a control system for controlling the rotational displacement about a torque axis of the body is provided. In particular, the resilient hydraulic mounting system has a pair of hydraulic mounts, each of which elastically connects a first body to a second body. Each hydraulic mounting includes a housing with at least one elastomeric member, and a variable-volume chamber disposed within each hydraulic mounting which contains a portion of the working fluid. This working fluid is displaceable in response to movement of the elastomeric member. In one embodiment, a conduit means interconnects the working fluid chamber of each of the hydraulic mountings. In another embodiment, the working fluid is carried within conduit means internal in the hydraulic mountings themselves. In all embodiments, a fluid reservoir is in communication with the fluid. This reservoir is connected to a second fluid conduit means which can be pressurized by means of a pressure source. Pressurizing this reservoir will apply a torque, or react to an applied torque which is acting between the two bodies.

In all embodiments, the system comprises a reservoir for containing a sufficient volume of fluid to accomplish the required rotational position changes within the operating limits and accommodate for fluid expansion due to temperature changes. All embodiments comprise a common pressure source which is connected to one of the fluid conduit means and is actuated to increase or decrease the pressure acting on the fluid contained in the fluid circuit. This change in pressure is accomplished by actuation of valve means. The valve means is actuated by a control input, and in turn, the control input is in response to a sensor means. Therefore, the change in rotational position of the bodies is controlled in response to control input. This external control signal can be the result of a programmed routine, a manually administered control signal, or a combined mechanical sensor/valve arrangement such as a leveling valve. In other words, the control of the valve can be in response to three basic functions: 1) a command from a programmed routine, 2) an externally applied control signal, or 3) a passive response to a sensor/valve arrangement such as a "leveling valve". The ultimate response of the system to any of these different control inputs is to pressurize the fluid contained in the fluid circuit and thus accomplish a change in the positioning of the system, or react varying torques applied to the system, or accommodate the changing temperature of the system.

In each embodiment of the present invention, the installation position or initial zero torque condition of the system will result in an initial positioning such that the system is at some position other than the desired operating position, i.e., the system is offset initially. The system is subsequently rotated into the desired operating position by applying a prescribed control pressure to the fluid circuit. Once the system is at the desired operating position, an applied torque or control signal input will initiate a response from the system to either increase or decrease the applied pressure, thus imparting a torque to the system. It is this static pre-pressure which occurs as a result of the applied torque to bring the system to the desired operating condition which allows the system to have improved bi-directional torque carrying capabilities.

Various other features, characteristics and objects of the present invention will become apparent after a reading of the detailed description of the preferred embodiments.

BRIEF DESCRIPTION OF THE DRAWINGS

The accompanying drawings which are incorporated in, and form a part of this specification, illustrate several key embodiments of the present invention. The drawings and description together, serve to fully explain the invention. In the drawings.

Reference will be made in detail to the present preferred embodiments of the invention, as well as the possible orientations conceivable in the invention.

DESCRIPTION OF THE PREFERRED EMBODIMENTS

Figure 1:
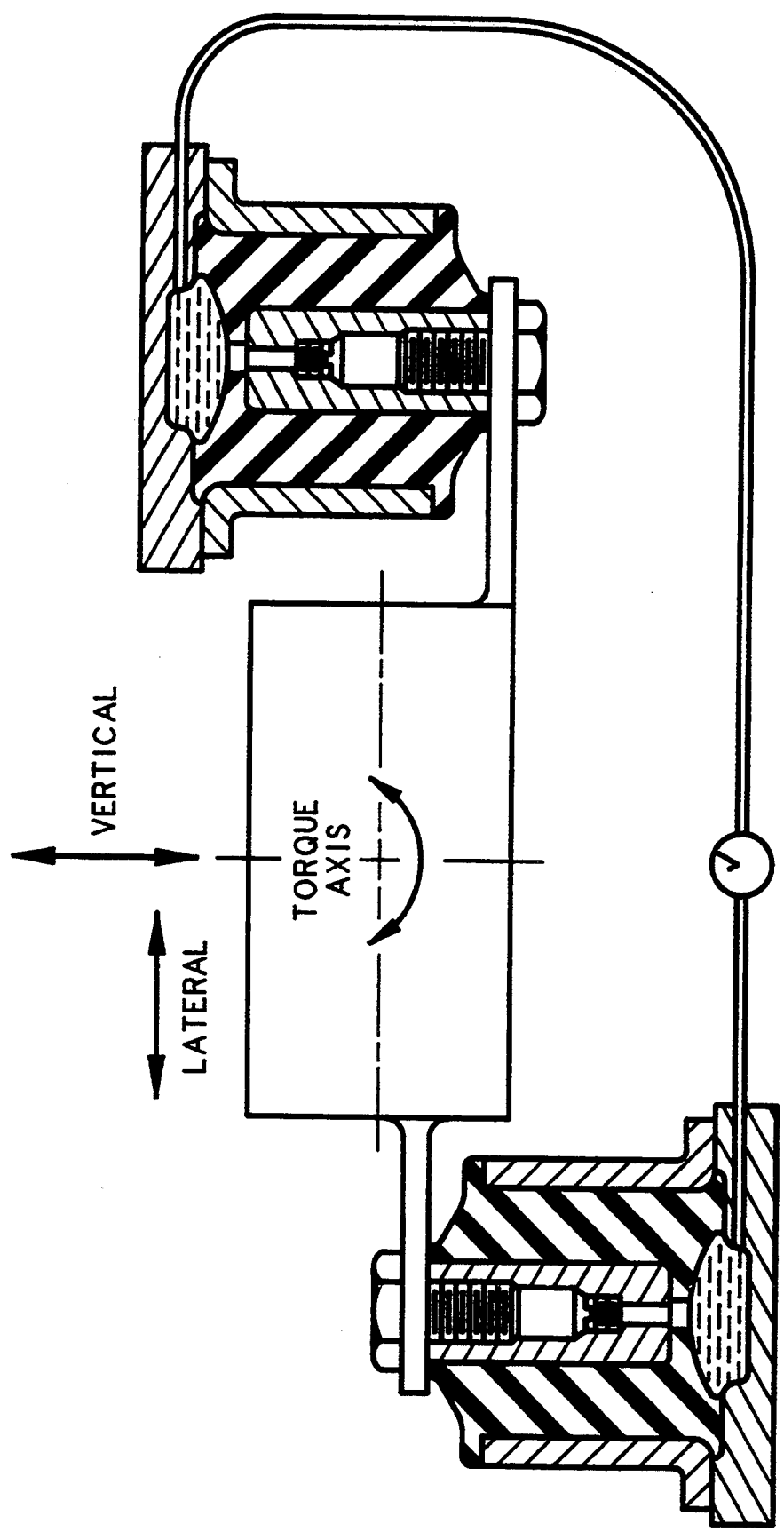
FIG. 1 is a schematic elevational view of the "prior art" system wherein, the working fluid chambers of both hydraulic mountings are connected and shown with an adjustable valve means between the two bodies.
Figure 2:
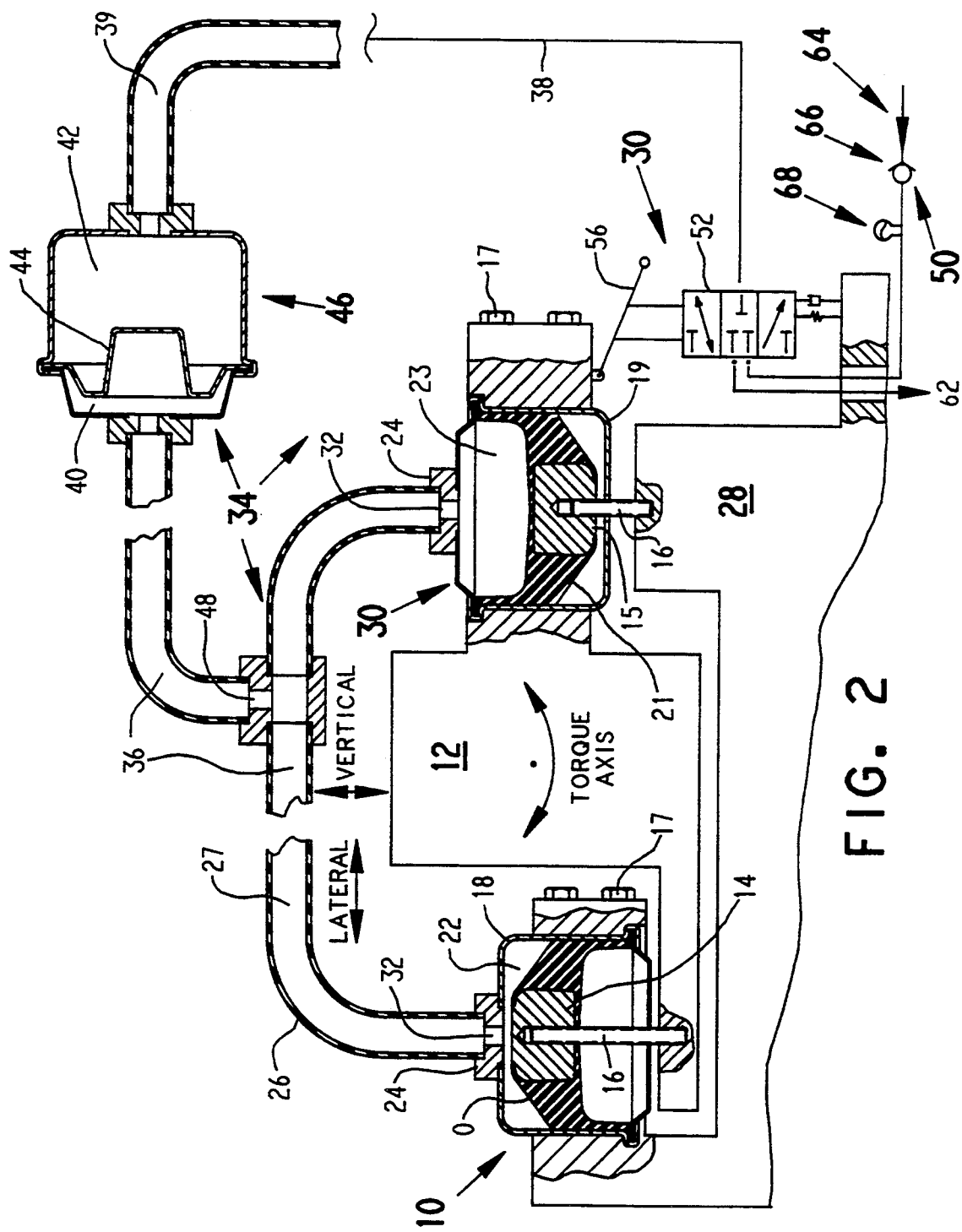
FIG. 2 is a schematic elevational view of a first preferred embodiment depicting the working fluid chambers in a first orientation where the fluid in the two mountings is acting on an opposite side of its respective elastomeric member, the system employing a passive control system.

A torque restraint system in accordance with a first embodiment of the present invention is shown in FIG. 2. Included is a first hydraulic mounting 10 which is connected to a first body 12 through an inner member 14 by first connecting means 16. The first hydraulic mounting 10 further includes a housing 18, and an elastomeric member 20 creating a working fluid chamber 22 and a conduit connecting means 24 for connecting to an inertia track 26. Of note is the orientation of the hydraulic mountings 10, 30 in the first embodiment, the inner member 14 of the first hydraulic mounting 10 is connected to the first body 12 by first connecting means 16 and the inner member 15 of the second hydraulic mounting 30 is connected to the second body 28 by a first connecting means 16. Similarly, the housing 18 of the first hydraulic mounting 10 is connected to the second body 28 via second connecting means 17 and the housing 19 of the second hydraulic mounting 30 is connected to the first body 12 via second connecting means 17. By way of example, the static load path is from the first body 12 into first connecting means 16 through inner member 14 and into the elastomeric member 20 and transferred to the housing 18 where the load is finally transferred into the second body 28. The inertia track 26 is used for carrying a portion of the working fluid 27 from the first hydraulic mounting 10 to the second hydraulic mounting 30. The working fluid 27 can be any incompressible fluid compatible with the elastomeric members 20, 21 such as glycol, polyglycol or silicone fluid. Shown in this embodiment is a special case of the first working fluid 27 where the substantially similar hydraulic mountings 10,30 are in contact with opposite sides of the elastomeric members 20,21. This unique configuration allows commonality of components. In other words, the same mold may be used for bonding, the same connectors may be used, and very similar dies for forming the stamped components may be used. The end result is lower manufacturing costs.

In one form of the invention, the conduit connecting means 24 which connects the inertia track 26 to the working fluid chambers 22, 23 can be accompanied by first restriction means 32 formed therethrough. In general, this takes the form of an orifice and serves to add damping to the system. It could also be a long narrow passage. In the embodiment of FIG. 2, the fluid circuit 34 is comprised of a first fluid conduit means 36, and a second fluid conduit means 38. The second fluid conduit means 38 contains a second fluid 39 such as air, or other compressible fluid. This embodiment is further comprised of an accumulator 46 which includes a first fluid reservoir 40, and a second fluid reservoir 42, and a separation means 44 which divide them. If it is desired to keep the relatively soft accumulator means 46 from interacting dynamically with the rest of the fluid circuit 34, a second restriction means 48 can be added. This can take the form of an orifice or a long narrow passage. The embodiment of the accumulator means 46 shown here should in no way be limiting as the unit could consist of a mechanically or hydraulically actuated piston, to create the change in pressure to the hydraulic mountings 10, 30 or any other reasonable pressurization unit. Also, the working fluids 27 in the first fluid conduit means 36 and the second fluid 39 in the second fluid conduit means 38 may be any combination of compressible or incompressible fluid, although it is preferably as was stated above.

The fluid circuit 34 is pressurized by a pressure source means 50 in the current embodiments. This pressure source means 50 can be made up of a pump means 64, a check valve means 66 and a second accumulator means 68. Any combination of elements which can constitute a pressurizing system could be used, or a reservoir alone. Particularly, for truck cab suspensions, it is desirable to connect to the air system. The pressure acting on the second fluid conduit means 38 is varied in response to valve means 52. Shown in the one embodiment is a valve means 52 comprising a four-way, three-position valve as shown in FIG. 2. The valve shown in this embodiment is in no way limiting, as any valve or combination of valves and sensors which can increase or decrease the pressure acting on the fluid circuit 34 will accomplish the same desired result.

The positioning of the first body 12 relative to the second body 28 is in response to the sensor means 56. In this embodiment shown in FIG. 2, the valve means 52 and sensor means 56 are combined in the form of a leveling valve 60. An applied torque results in the second body 28 being "leveled" relative to the first body 12. In other words, the system acts as though it is infinitely stiff statically, because no matter how much torque is applied the body will retain the same relationship between the bodies statically. The actuation of the valve means 52 is generally in response to a specific operating condition, such as slow gradual cornering. The valve means 52 response will serve to increase or decrease the pressure acting on the circuit means 34, thus imparting a torque which will in turn cause the system to react and level itself.

The leveling valve 60 generally consists of a connection between the first body 12 and the second body 28, wherein the deflection can be measured and the valve means 52 can respond through a mechanical connection or hydraulic connection between the sensor means 56 and valve means 52. The valve means is generally connected to a pressure source means 50 and a valve exhaust means 62. An interesting case for this improved system is when one body is subjected to a roll inducing dynamic input. In this case, the system appears dynamically soft. This is because the leveling valve is designed such that it has a mechanical/hydraulic null band, i.e., a time limit and deflection limit under which the system will not quickly react. Thus for impact loading the improved system will isolate these roll inputs. Further, because of the leveling ability, it is now possible to use soft elastomers, thick sections, and few or no shims in the elastomeric members 20, 21, thus resulting in very soft translational lateral and vertical stiffnesses and improved translational isolation. Further, if the mounting system should heat up after extended operation, or otherwise change temperature, the system can accommodate for the change in thermal expansion of the fluid 27 by re-leveling itself, i.e., by venting excess pressure in the compressible fluid loop to counter the pressure buildup resulting from the temperature increase.

Figure 3:
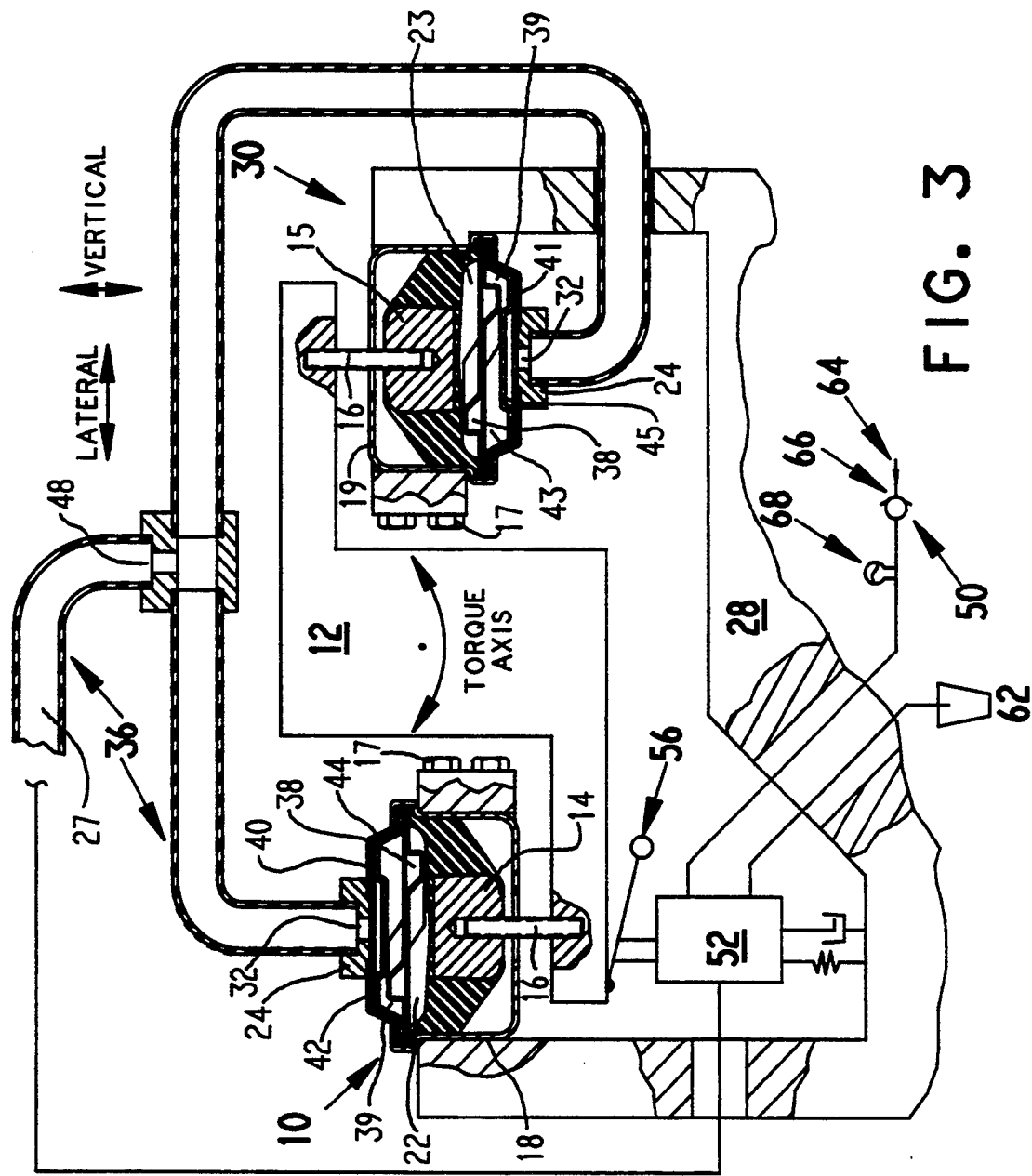
FIG. 3 is a schematic elevational view of a second preferred embodiment depicting the working fluid chambers in a second orientation with the fluid still effectively operating on opposite sides of the elastomeric members, the passive control system utilizing a leveling valve feature.

A second embodiment is shown in FIG. 3, wherein the second fluid conduit means 38 functions similar to the inertia track 26 of the previous embodiment and is within each hydraulic mounting 10, 30. The second fluid conduit 38 is formed by placing two stamped plates back to back which each have a portion of the fluid passage stamped on them. In this embodiment, the first hydraulic mounting 10 is connected to a first fluid conduit means 36 with a conduit connecting means 24, which is in turn connected to a second hydraulic mounting 30 by conduit connecting means 24. Further, the second embodiment shown in FIG. 3 shows a second orientation, where the inner members 14,15 of both hydraulic mountings 10, 30 are connected to a first body 12 by connecting means 16 and the housings 18, 19 are connected to a second body 28 by second connecting means 17. The housing 18, 19 in this embodiment is shown connected to a split clevis arrangement, but in no way should this be considered limiting as it could be bolted or otherwise fastened. Further, each hydraulic mounting 10, 30 is comprised of a working fluid chamber 22, 23. The conduit means 38 can be long and narrow such that they provide a throttling action or restriction. The second embodiment also includes a first fluid reservoir 40, 41 and a second fluid reservoir 42, 43. The first fluid reservoir 40, 41 and a second fluid reservoir 42, 43 are separated via separation means 44, 45 which keeps the fluids in the first fluid conduit means 36 and the second fluid conduit means 38 from mixing. A first restriction means 32 can be added to keep the first hydraulic mounting 10 and second hydraulic mounting 30 from interacting dynamically. In order to keep the rate of change in pressure low and avoid application of torque too quickly, a second restriction means 48 can also be added. Both restriction means 32 and 48 can take the form of an orifice or a long narrow passage. The system is pressurized by a pressure source means 50 in the second embodiment also. This pressure source means 50 can take any form which is practical. The pressure acting on the second fluid 39 and first fluid 27 in the fluid circuit means 34 is again varied in response to valve means 52 which in turn respond to sensor means 56. The valve shown in this embodiment is a leveling type valve, but in no way should this be considered limiting, as any valve or combination of valves which can increase or decrease the pressure acting on the fluid circuit 34 will accomplish the same desired result. The fact that there is a significant pressure applied at all times gives this torque-restraint system its bi-directional torque capability. The system as installed has an offset. When the system is activated, the pressure source 50 supplies a pressure to the fluid circuit 34 to bring the system to its upright leveled condition. This pressure is significant enough to prevent cavitation from occurring and, thus, increased torque carrying capabilities are achieved in the negative torque direction. In addition, improved damping in the negative torque direction is achieved, because of the lessened propensity of the fluid 39 to cavitate.

Figure 4:
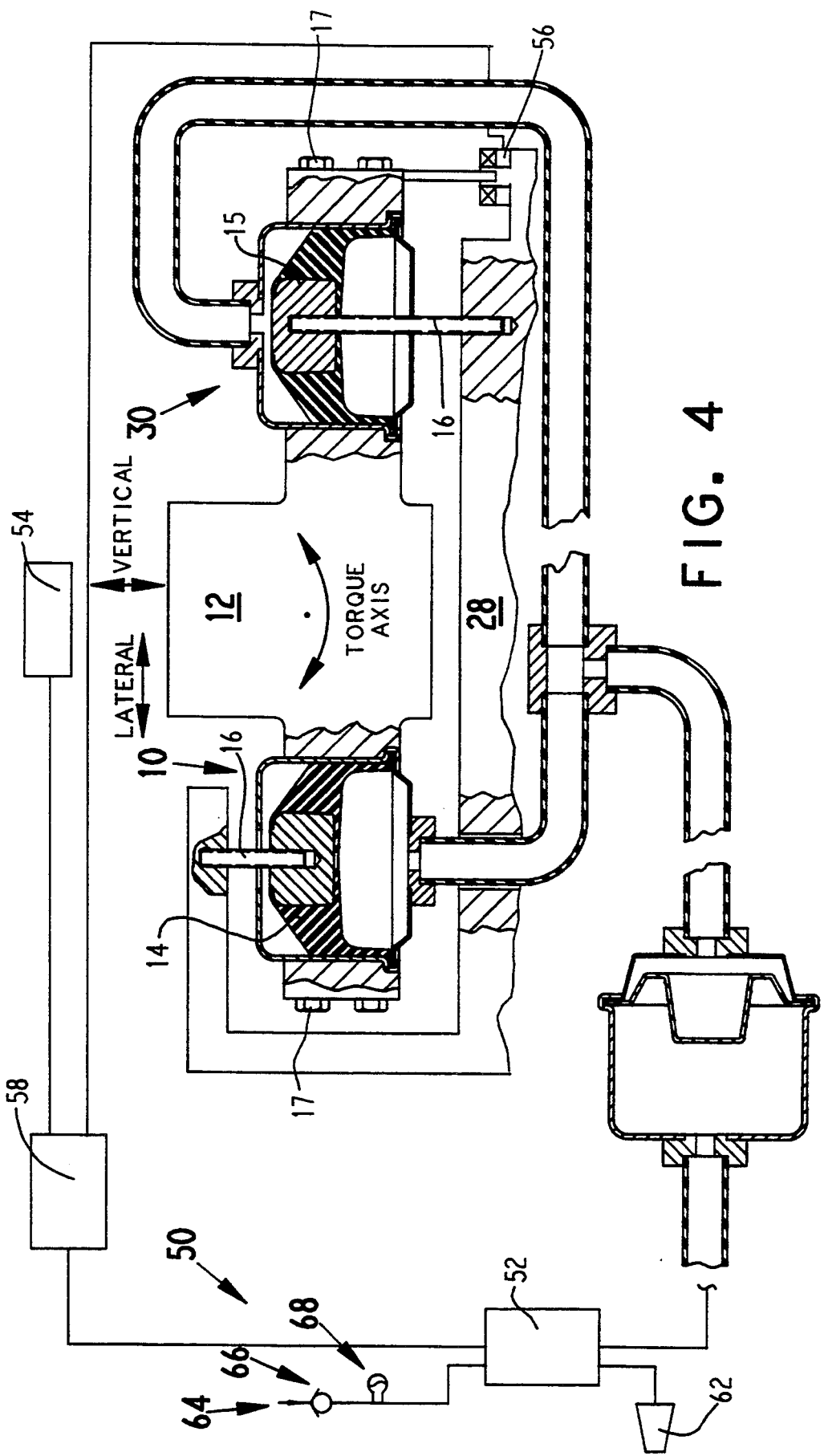
FIG. 4 is schematic elevational view of a third preferred embodiment depicting yet a third orientation for connecting the two bodies employing external control or a programmed control feature; and, FIG. 5 is schematic elevational view of a fourth preferred embodiment depicting the working fluid chambers shown in a fourth orientation.

The remaining FIG. 4 and FIG. 5 show a third and a fourth embodiment, respectively, in which the mounts are shown in two other possible orientations. FIG. 4 shows a third orientation, where the inner members 14, 15 of both hydraulic mountings 10, 30 are connected to a second body 28 by first connecting means 16 and the housings 18, 19 are connected to a first body 12 by second connecting means 17. Also shown in FIG. 4 is the control system wherein, the system can respond either by an external control means 54 or as a programmed response to an input to the electronic control means 58. In this configuration, a sensor means 56 can sense the conditions resulting from relative torque, and the information can be used by the electronic control module 58. As a result, the valve means 52 may be actuated. In the third embodiment, a valve means 52 is shown connected to a valve exhaust means 62 and a pressure source means 50, made up collectively of a second accumulator means 68, a check valve means 66 and a pump means 64. Any combination of elements which serve to provide a pressure source means 50 will be adequate.

FIG. 5 shows a fourth embodiment depicted in a fourth orientation of the hydraulic mountings 10, 30 wherein the housing 18 of the first hydraulic mounting 10 is in registry with the first body 12 and the housing 19 of the second hydraulic mounting 30 is in registry with the second body 28 and the inner member 14 of the first hydraulic mounting 10 is connected to the second body 28 by first connecting means 16 and the inner member 15 of the second hydraulic mounting 30 is connected to the first body 12 by first connecting means 16. For clarity, the pressure source means 50, valve means 52, external control means 54, sensor means 56, and electronic control means 58 have been omitted. In each of the embodiments described above, the torque-control system has definite deflection limits. These limits should be enforced by stops such as rubber bumpers at the limits in each rotational direction. The particulars of course will depend on the spacing of the hydraulic mountings 10, 30 and their physical parameters.

The embodiments described above, provide for several methods of attaching the improved torque-control system. The invention, further provides for control of a first body relative to a second body such that the relative rotational displacements between the bodies are kept within certain limits. Additionally, the system provides an extremely stiff static roll stiffness, yet is very soft in translation, statically and dynamically, and a system which is dynamically soft in roll, as well. This provides excellent roll control, yet provides superior isolation in roll and translation. Also, it provides a system for controlling the motions resulting from application of torque about the torque axis in both the positive and negative torque directions. As a result of the bi-directionality, it provides improved damping in the positive and negative torque directions as well. Further, the system can accommodate for the change in temperature of the working fluid in the mountings and allow for this by maintaining a predetermined relative rotational displacement between the two bodies. Various changes, alternatives and modifications will become apparent to those skilled in the art following a reading of the foregoing specification. It is intended that all such changes, alternatives and modifications fall within the appended claims be considered part of the present invention.

I claim:

1. A system for restricting the torque-induced deflection between two bodies, said system comprising:
   a) a first hydraulic mounting;
   b) a second hydraulic mounting;
   c) each said first and second hydraulic mounting having an inner member, a housing, and an elastomeric member in between said inner member and said housing,
   a first one of said inner member and said housing of said first hydraulic mounting being attached to said first body and a first one of said inner member and said housing of said second hydraulic mounting attached to said first body,
   said other of said inner member and housing of said first hydraulic mounting being attached to said second body and said other of said inner member and said housing of said second hydraulic mounting also attached to said second body;
   d) sensor means for detecting a condition resulting from relative torque between said two bodies;
   e) a fluid circuit carrying working fluid at a desired operating pressure to said first and second hydraulic mountings, said fluid circuit including
     i) a first fluid conduit means carrying said working fluid interconnecting said first hydraulic mounting with said second hydraulic mounting,
     ii) a source of auxiliary fluid pressure for varying said desired operating pressure of said working fluid; and
   f) means to control the desired operating pressure of said working fluid responsive to said sensor means, said means to control including a valve interconnecting said source of auxiliary fluid pressure with said fluid circuit.

2. The system set forth in claim 1 wherein said first and second hydraulic mountings comprise substantially identical mountings, said elastomeric member subdividing each housing into a primary chamber and a secondary chamber, the working fluid of said second hydraulic mounting being located in said secondary chamber on an opposite side of said elastomeric member relative to a similar said elastomeric member of said first hydraulic mounting the working fluid being located in said primary chamber thereof.

3. The system set forth in claim 1 wherein said means to control further comprises an accumulator subdivided into two compartments by a flexible separation means, a first of said compartments containing an incompressible fluid and a second of said compartments containing a compressible fluid.

4. The system set forth in claim 3 further comprising a second fluid conduit means interconnecting said source of said auxiliary fluid pressure with one of said compartments of said accumulator.

5. The system set forth in claim 4 wherein said first compartment containing said incompressible fluid is connected to said first conduit means and said second compartment containing said compressible fluid is interconnected to said source of auxiliary fluid pressure.

6. The system set forth in claim 5 further comprising a fluid-restricting orifice positioned in said first fluid conduit means between said first and second hydraulic mountings and said first compartment of said accumulator.

7. The system set forth in claim 1 wherein said sensor means comprises a position detector for determining when one of said bodies is subjected to a deflection-inducing torque relative to the other of said bodies, said position detector sending a signal to said valve to alter its position causing said source of auxiliary fluid pressure to change the desired operating pressure thereby resisting said deflection-inducing torque.

8. The system set forth in claim 1 wherein said valve of said means to control comprises a four-way, three-position valve.

* * * * *